US006386419B2

(12) United States Patent
Coletta et al.

(10) Patent No.: US 6,386,419 B2
(45) Date of Patent: May 14, 2002

(54) FRICTION PULL PLUG WELDING: TOP HAT PLUG DESIGN

(75) Inventors: Edmond R. Coletta, New Orleans; Mark A. Cantrell, Pearl River, both of LA (US)

(73) Assignee: Lockhead Martin Corporation, New Orleans, LA (US)

( * ) Notice: Subject to any disclaimer, the term of this patent is extended or adjusted under 35 U.S.C. 154(b) by 0 days.

(21) Appl. No.: 09/814,583

(22) Filed: Mar. 22, 2001

Related U.S. Application Data

(63) Continuation of application No. 09/545,980, filed on Apr. 10, 2000, now Pat. No. 6,230,958.
(60) Provisional application No. 60/153,750, filed on Sep. 13, 1999.

(51) Int. Cl.[7] .......................... B23K 20/12; B23K 37/00
(52) U.S. Cl. ........................................ 228/2.3; 228/48
(58) Field of Search ............................ 228/2.3, 2.1, 45, 228/48, 49.1, 49.2; 156/73.5; 29/402.13, 402.16

(56) References Cited

U.S. PATENT DOCUMENTS

| 4,087,038 | A | * | 5/1978 | Yagi ........................ 228/114.5 |
| 5,469,617 | A | * | 11/1995 | Thomas et al. ............. 164/108 |
| 5,971,252 | A | * | 10/1999 | Rosen et al. ............. 228/112.1 |
| 5,975,406 | A | * | 11/1999 | Mahoney et al. ......... 228/112.1 |
| 6,045,027 | A | * | 4/2000 | Rosen et al. ............. 228/112.1 |

\* cited by examiner

*Primary Examiner*—Tom Dunn
*Assistant Examiner*—Colleen P. Cooke
(74) *Attorney, Agent, or Firm*—Garvey, Smith, Nehrbass & Doody, LLC

(57) ABSTRACT

Friction Pull Plug Welding is a solid state repair process for defects up to one inch in length, only requiring single sided tooling, or outside skin line (OSL), for preferred usage on flight hardware. The most prevalent defect associated with Friction Pull Plug Welding (FPPW) was a top side or inside skin line (ISL) lack of bonding. Bonding was not achieved at this location due to the reduction in both frictional heat and welding pressure between the plug and plate at the end of the weld. Thus, in order to eliminate the weld defects and increase the plug strength at the plug 'top' a small 'hat' section is added to the pull plug for added frictional heating and pressure.

32 Claims, 3 Drawing Sheets

FRICTION PULL PLUG WELDING: TOP HAT PLUG DESIGN

CROSS-REFERENCE TO RELATED APPLICATIONS

This is a continuation of U.S. patent application Ser. No. 09/545,980, now U.S. Pat. No. 6,230,958 filed Apr. 10, 2000, which is incorporated herein by reference.

The assignee is the owner of patent application Ser. No. 09/141,294 now U.S. Pat. No. 6,213,379, Aug. 26, 1998, entitled "Friction Plug Welding," and incorporated herein by reference. For parameters not mentioned herein, see patent application Ser. No. 09/141,294 now U.S. Pat. No. 6,213,379.

Priority of U.S. Provisional Patent Application Ser. No. 60/153,750, filed Sep. 13, 1999, incorporated herein by reference, is hereby claimed.

STATEMENT REGARDING FEDERALLY SPONSORED RESEARCH OR DEVELOPMENT

The invention described herein was made in the performance of work under NASA Contract No. NAS8-36200 and is subject to the provisions of Section 305 of the National Aeronautics and Space Act of 1958 (42 U.S.C. Section 2457).

REFERENCE TO A "MICROFICHE APPENDIX"

Not applicable

BACKGROUND OF THE INVENTION

1. Field of the Invention

The present invention relates to friction welding. More particularly, the present invention provides an improved method and apparatus of friction plug welding that employs a specially configured pull plug that enhances bonding and that is suitable for flight hardware usage.

2. General Background of the Invention

Friction stir welding (FSW) is a solid state joining process developed by The Welding Institute (TWI), Cambridge, England and described in U.S. Pat. No. 5,460,317, incorporated herein by reference. Also incorporated herein by reference are U.S. Pat. No. 5,718,366 and all references disclosed therein. The following references are also incorporated herein by reference: U.S. Pat. Nos. 3,853,258, 3,495,321, 3,234,643, 4,087,038, 3,973,715, 3,848,389; British Patent Specification No. 575,556; SU Patent No. 660,801; German Patent No. 447,084, "New Process to Cut Underwater Repair Costs", TWI Connect, No. 29, Jan. 29, 1992; "Innovator's Notebook", Eureka Transfer Technology, October 1991, p. 13; "Repairing Welds With Friction-Bonded Plugs", NASA Tech. Briefs, September 1996, p. 95; "Repairing Welds With Friction-Bonded Plugs", Technical Support Package, NASA Tech. Briefs, MFS-30102; "2195 Aluminum-Copper-Lithium Friction Plug Welding Development", AeroMat '97 Abstract; "Welding, Brazing and Soldering", Friction welding section: "Joint Design", "Conical Joints", Metals Handbook: Ninth Edition, Vol. 6, p. 726.

Friction plug welding (FPW), also referred to as plug welding and friction taper plug welding (FTPW), is a process in which initial defective weld material is located, removed and replaced by a tapered plug, which is friction welded into place. This process is similar to friction stud welding, in which a plug is welded to the surface of a plate, end of a rod, or other material. The primary difference is that FPW is designed to replace a relatively large volume of material containing a defect whereas friction stud welding is a surface-joining technique.

Friction plug welding could be used to repair weld defects in a wide variety of applications; however, it would most likely be used where weld strength is critical. This is due to the fact that manual weld repairs result in strengths much lower than original weld strengths, as opposed to friction plug welds (FPWs) whose typical mechanical properties exceed that of the initial weld. In applications where high strength is not required, manual welding would be less expensive and would not require specialized equipment.

An extension of FPW is known as stitch welding or friction tapered stitch welding (FTSW) and has been developed to repair defects longer than what a single plug can eliminate. Stitch welding is the linear sequential welding of several plugs such that the last plug weld partially overlaps the previous plug. Defects of indefinite length can be repaired with this process, limited only to the time and cost of performing multiple plug welds. These welds have undergone the same testing procedures as single FPWs, including NDI and destructive evaluation. The strengths for stitch welds are similar to those for single plug welds.

Stagger stitch welding is a process best defined as stitch welding in a non-linear fashion. Areas wider than one plug length can be completely covered by staggering plugs side to side as they progress down the length of an initial weld. This process is being developed for plug welds whose minor diameter is on the crown side of the initial weld, and where replacement of the entire initial weld is desired.

While friction plug welding might be a preferred method of repairing defects or strengthening initial welds, there are some applications where heretofore it has been extremely difficult to use friction plug welding. The main cause is due to the logistics of setting up the equipment and/or support tooling to perform friction plug welding, and the geometry of the workpiece to be welded.

BRIEF SUMMARY OF THE INVENTION

The present invention provides an improved method and apparatus for friction plug welding an article using a plug that has an improved configuration and geometry that facilitates a good weld when the plug is pulled.

With previous pull plug designs (which typically did not include an angular transition), the plug top usually did not weld to the plate top in 0.385" gage plate. This lack of bonding resulted in penetrant, x-ray defects, and ultrasonic indications at the plug top, ultimately leading to a reduction in tensile strength. Since a friction pull plug welding (FPPW) process that produces defects would not be considered for usage on flight hardware, the defects along the interface have to be eliminated.

The "Top Hat" plug design of the present invention ensures complete bonding between the plug and the plate on the inside skin line (ISL) side of the weld. The top hat achieves this improvement through a combined effect of supplying additional material to frictionally heat at the plug top end portion, as well as providing additional radial and axial pressure at plug top. Overall weld quality is significantly improved with the addition of the "Top Hat" to a plug, through the elimination of all top side defects as characterized through NDE evaluation (Dye Penetrant, X-Ray, and Ultrasonic), and through a higher tensile strength weld interface.

Listed below are typical and exemplary dimensions of a "top hat" plug design; a 3/16" radius is utilized in the curved annular surface transition from the plug body to the "top hat"; the plug top hat has a diameter of 1.250" to 1.480" extending out from the body by 0.050" to 0.250"; the plug hat has a thickness of 0.020", however the thickness can range up to 0.100" thick.

The present invention includes a method of friction plug welding an article, comprising several stages. Preferably, the first stage is making a hole (that is preferably tapered) in the article to be welded. Machining a tapered hole is not necessarily required in friction plug push welding where (in certain situations generally characterized when the article to be welded is softer (having lower hardness) relative to the harder (having higher hardness) plug) the plug will form a hole, self bore or embed into the material either while rotating or not. A tapered plug is inserted through the tapered hole. The plug is then attached to a chuck of a rotary tool or like motor which can both pull on the tapered plug and rotate it. Some connector or connection means, such as threads, key grooves, flats, or locking retention interface, are provided on the tapered plug to facilitate pulling the plug with the rotary tool.

The second stage, or heating cycle is always required to weld the plug to the article. This stage preferably consists of rotating the plug while pulling (placing the plug in tension axially) into intimate contact with the hole's surface, or region surrounding the hole. The typical axial load exerted on the plug during the heating phase is between about 1000 pounds and 20,000 pounds, preferably between about 6000 pounds and 18,000 pounds, more preferably 10,000 pounds to 16,000 pounds, and most preferably 12,500 pounds to 15,000 pounds.

Other forms of heating may also be utilized, including but not limited to, using electricity to assist in the heating process, or vibrational energy such as oscillatory rotation rather than the preferred method of continuous rotation, or lateral, axial or some combination thereof, rapid displacement (such as ultrasonic welding) to impart sufficient energy to assist in the heating the weldment. The plug (preferably tapered, with a taper the same as or preferably different from the taper of the hole (if it is tapered), and rotating the plug relative to the part while moving the plug in the direction such to make contact with the hole's surface, until contact is made, and forcing the plug into the surface of the hole by pulling on the plug (imposing a tensile force in the plug in the plug's axial direction) all while continuously spinning the plug relative to the article.

The third stage of the method of the present invention is the braking stage. This rapid deceleration of rotation, if rotation is used (or otherwise defined as rapid decline of energy input to zero or near zero), is necessary to performing a successful weld. Preferably, the fourth stage which is also referred to as the forging stage, is a period of cooling in which no further heating energy is intentionally applied to the weldment and energy in the form of heat is dissipated. During this stage, it is preferable to maintain either the same axial tensile load, or a different axial tensile load whether that be greater or lesser, to cause densification and or maintain or create a sound metallurgical bond or weldment. In the current application, although not necessarily required in other applications, excess sections of the plug are cut off and material further removed via grinding and sanding to make it smooth with the initial weldment and/or surrounding materials' surfaces. The present invention also includes the plug.

The displacement during heating should be optimized for the specific plug geometry and hole geometry combination being welded. Empirical models can be developed to ensure that the heating displacement is great enough to enact the benefits' of the "top hat", while not producing a weld with defects, such as weld pull through, lack of bonding, or grain separation.

In the preferred embodiment of the method of the present invention, a tapered hole is drilled from one side of the article being repaired. A tapered plug is then inserted through the tapered hole, then the plug is attached to a chuck of a motor which can both pull on the tapered plug and spin it. Some connection means, such as threads or locking retention interface, are provided on the tapered plug to facilitate pulling the plug. The plug is pulled while spun by the motor. Preferably the plug is pulled also after the spinning stops, with a load the same as or different from the load while spinning. After the spinning has taken place and the plug is welded in place, the excess part of the plug is cut off and the weld machined down to make it smooth. Pulling a tapered plug during plug welding allows all equipment, including a backing plate, to be on one side of the article being welded. Pull welding eliminates the need for large backing structures that must react high loads associated with friction plug push welding, often exceeding 10,000 pounds force, while at the same loads deflect an amount often less than 0.25 inches.

A hydraulically powered direct drive weld has been used; however, an electrically powered direct drive, or inertia drive flywheel weld system may also be used.

The inventors have discovered that satisfactory welds occur most frequently when the plug diameter is large enough to maintain a mechanically stable cool core. For this reason, plug diameters have continued to increase, and more powerful weld equipment has been acquired. Techniques have been developed to weld larger diameter plugs while minimizing the required motor power. One such discovery entails varying the axial stroke rate during the weld process to decrease the initial contact friction. In this process, it is preferable for the plug and article to contact slowly, thereby reducing the rotational friction at contact. After the boundary between the plug and article plasticizes, then it is preferable, although not required, to increase the stroke rate, thereby increasing the rate of heating at the interface to achieve weld temperatures. This discovery significantly reduces the required power to perform welds, and is advantageous in performing large welds whose power requirement exceeds that which the system is designed to deliver.

The inventors have has found that with their current equipment and process, the preferable operating range at which to rotate the plug is 4000–6000 rpm prior to contact between the plug and hole's surface, and it is also preferable to maintain a minimum of 3000 rpm during the duration of the heating cycle. Successful welds have been created at much slower speeds, as low as but not limited to 1000 rpm prior to contact and as high as, but limited only by the equipment capability, of about 7000 rpm prior to contact.

The plug of the present invention preferably has a connection means comprising a standard external thread. The thread can be, for example, right-hand ¾" with 16 threads per inch. Other methods for holding the plug in the chuck may also include internal threads and key grooves.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 5:
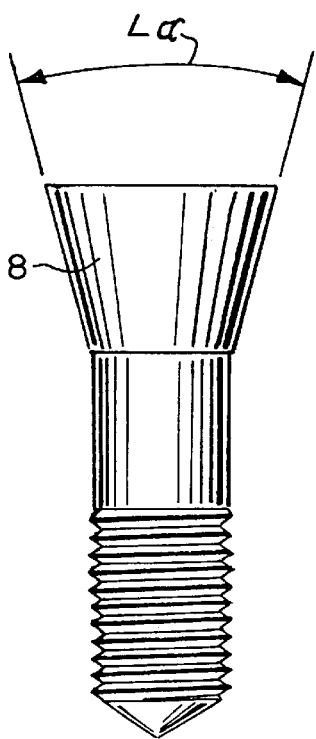
FIGS. 5 and 6 are side elevational views of pull plugs that do not include the enlarged annular curved shoulder at one end portion of the plug.
Figure 6:
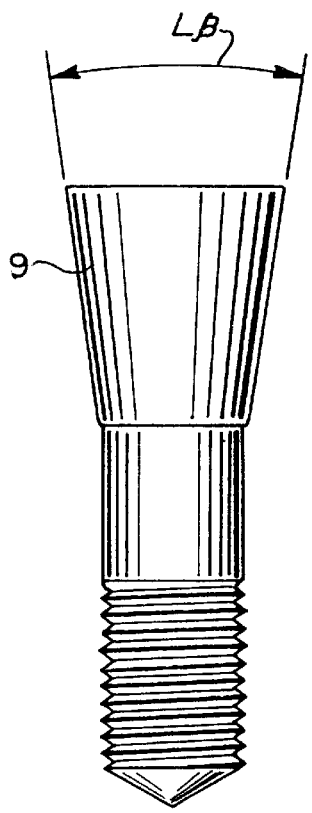
Figure 1:
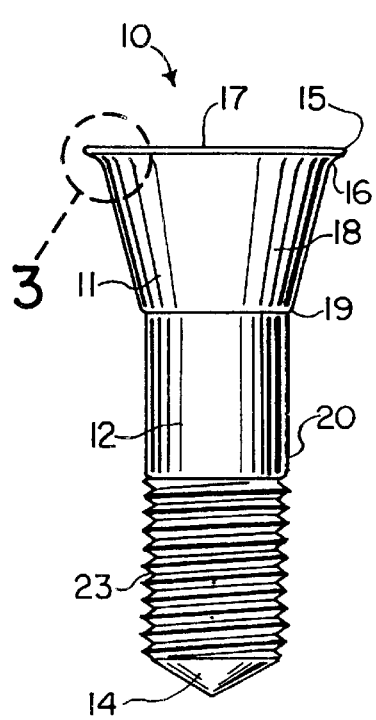
FIG. 1 is a side view of the preferred embodiment of the apparatus of the present invention illustrating the pull plug portion that is used as part of the method of the present invention.
Figure 2:
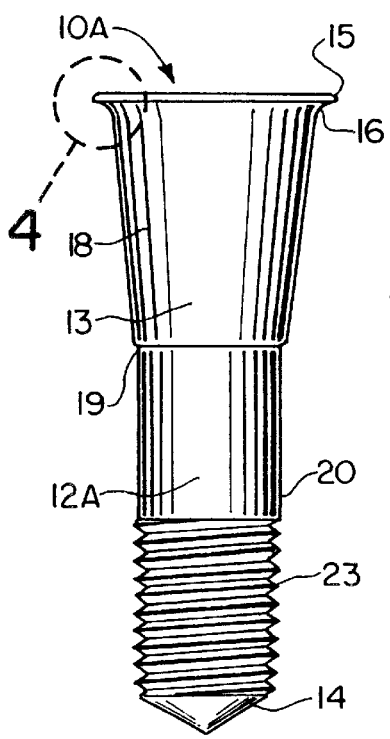
FIG. 2 is a side view of an alternate embodiment of the apparatus of the present invention illustrating the pull plug portion that is used in the method of the present invention.
Figure 3:
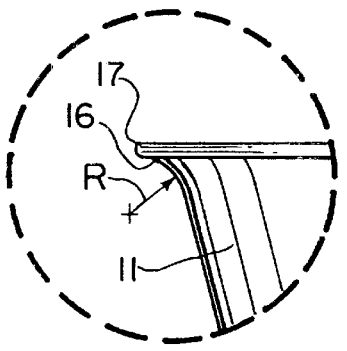
FIG. 3 is a fragmentary side view of the pull plug portion of the preferred embodiment of the apparatus of the present invention.
Figure 4:
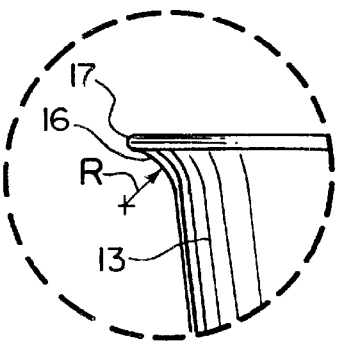
FIG. 4 is a fragmentary side view of the pull plug portion of the alternate embodiment of the apparatus of the present invention.
Figure 9:
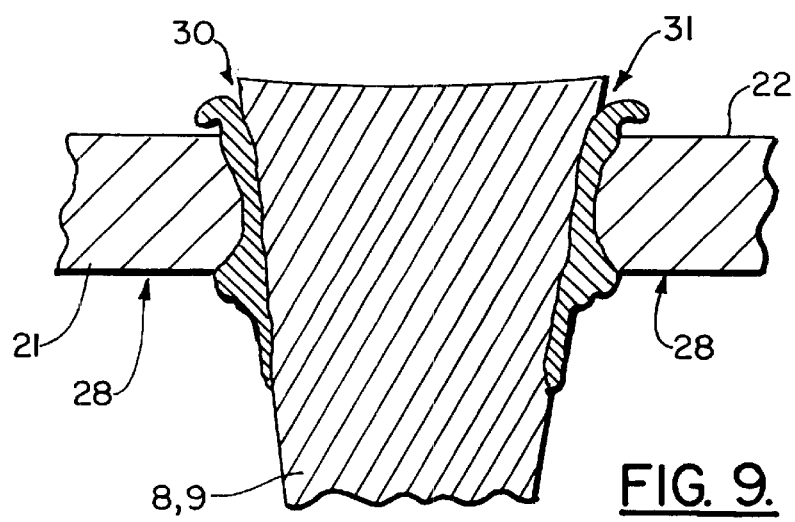
FIG. 9 is a sectional view illustrating a lack of bonding that can occur when a pull plug does not include the improved configuration of the present invention.

In FIG. 1, the preferred embodiment of the apparatus of the present invention is designated generally by the numeral 10. FIG. 2 shows an alternate embodiment designated as 10A. In FIG. 1, the pull plug 10 has a frustoconically shaped section 11 and a preferably cylindrically shaped, externally threaded shank 12. In FIG. 2, the pull plug 10A has a longer frustoconical section 13 and a shank 12A. Plugs 8 and 9 in FIGS. 5, 6 respectively show plugs that do not provide the "top hat" of the present invention, namely the enlarged, curved annular shoulder shown (enlarged) shown in FIGS. 3 and 4, and designated by the numerals 15, 16, 17. A lack of complete bonding can occur when using plugs such as 8 and 9. In FIG. 9, the lack of bonding is illustrated by arrows 30, 31.

In each of the embodiments of FIGS. 1 and 2, the shank 12 or 12A can be generally cylindrically shaped having a tip 14. External threads 23 can be provided on each shank 12, 12A. The external threads 23 on shank 12 or 12A enable a drill, drill chuck or rotary tool 25 (see FIGS. 7–8) to be fastened to shank 12 so that rotation and tension can be imparted to plug 10 or 10A.

The frustoconical sections 11 and 13 are integrally joined to a "top hat" or enlarged diameter section 15. In FIGS. 1–4 the enlarged diameter section 15 is defined by a curved annular surface 16 having edge 17. Curved annular surface 16 can be for example a radius which is generated 360 degrees. Edge 17 defines the largest diameter of an overall upper or top portion 18 of pull plug 10. The top portion 18 extends from annular shoulder 19 to edge 17. Lower portion of each pull plug 10, 10A is designated by the numeral 20 and includes shank 12 and tip 14.

Using the method of the present invention, a pair of sections 21, 22 that have been welded may possibly have a defect in the weld. The weld defect is preliminarily located and removed by drilling, for example. Friction plug welding (FPW) hole geometries are an important factor to creating a successful weld. The hole 24 is made by mechanically removing the weld bead flush to the top and bottom sides or the surrounding plate or sheet, drilling a pilot hole, and counter sinking with a counter sink cutter. The current included angle is typically 20° to 120°, preferably 40° to 90°, and most preferably 40° to 60°, although it is possible to perform similar welds with no angle (a straight bored hole), or opposite bored tapers (those which the taper of the plug and hole are opposing each other). A dual chamfered hole 24 can be used. Such a dual chamfer arrangement is disclosed in copending application Ser. No. 60/156,734, entitled "Friction Pull Plug Welding: Dual Chamfered Plate Hole", which is incorporated herein by reference. The hole 24 is drilled to a depth such that the minor diameter is 0.00" to 0.200" greater in diameter than the diameter of the plug's shaft.

The major diameter of the plug 10, 10A is typically equal to or greater than the major diameter of the hole 24. Current shaft diameters have ranged from ⅝" to ¾" in diameter; however, diameters ranging from between 1" and 1.5" are planned. Current plug major diameters (the diameter on the larger side of the taper) typically range from 1" to 1.35", but have been made less than ¾" and may be made in excess of 1.5". The plug body included angle, before the annular surface transition to the top hat, ranges from 10° to 90°, most preferably between 15° to 60°.

Figure 7:
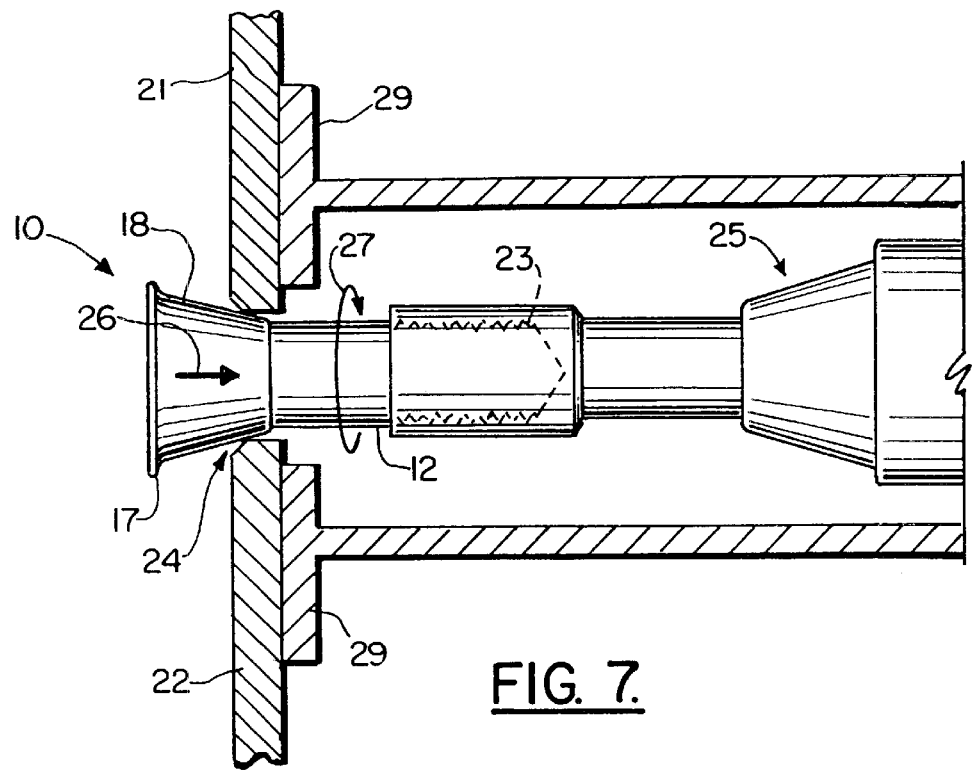
FIG. 7 is a side partial sectional elevation view illustrating the method of the present invention.
Figure 8:
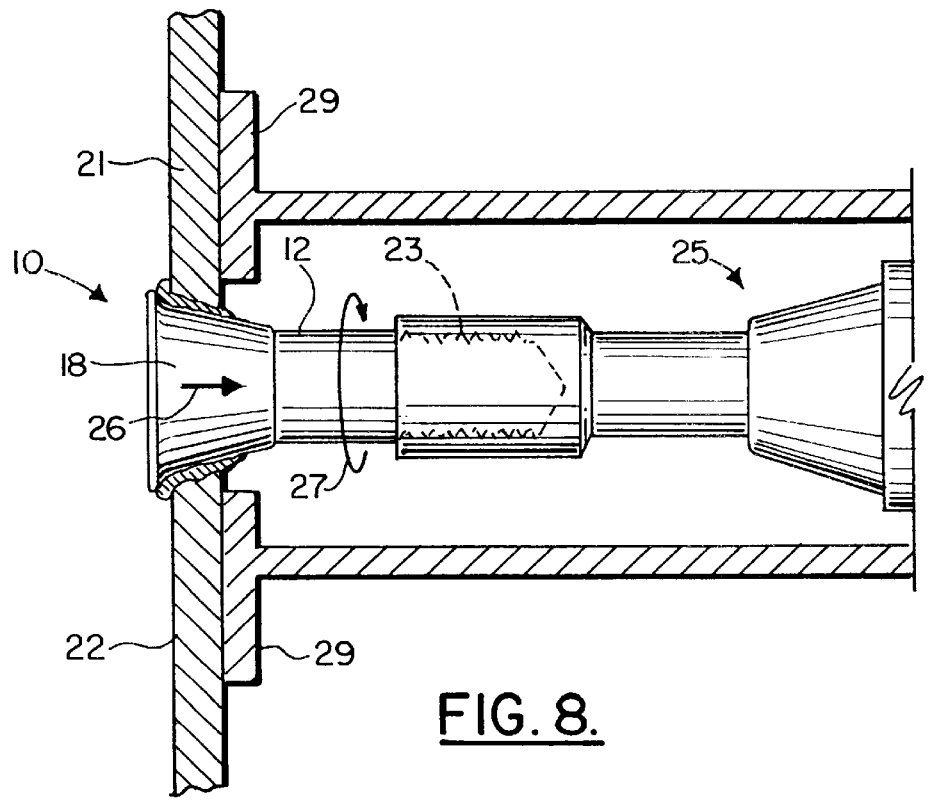
FIG. 8 is another side sectional elevation view illustrating the method of the present invention.

The method of the present invention includes the selection of a pull plug 10 or 10A that is then placed in the opening 24 formed when the defect is removed. In FIG. 7, a rotary tool 25 is then attached to the pull plug lower portion 20 at shank 12 (eg. at threaded connection 23). Tension is applied to the rotary tool, pulling the connected plug 10 or 10A (see arrow 26, FIGS. 7, 8) so that its top portion 18 tightly engages the opening 24 that is formed by the drill at the flaw or defect in the weld. A hydraulic ram can be used to pull the rotary tool 25, as an example.

Tension applied to a plug 10, 10A is preferably 6000–18000 lbs, more preferably 10000–15000 lbs, and most preferably 12500–15000 lbs. During the application of such tension, the plug 10 or 10A is preferably rotated (see arrow 27, FIGS. 7–8) at least 4,000 revolutions per minute, more preferably at least 5000 RPM, most preferably at least 6000 RPM, and perhaps even higher with proper equipment. The inventors have found that reliability and robustness increase with increasing RPM.

The forging phase for typical weld geometry (see FIGS. 1–5) exerts an axial tensile load of typically 1000 pounds to 20,000 pounds, preferably 6000 pounds to 16,000 pounds, more preferably 8000 pounds to 15,000 pounds, and most preferably 12,000 pounds to 14,000 pounds, as the weld cools. After several seconds, (typically less than one minute, preferably about 5 seconds), the weld has cooled sufficiently to remove the tensile load and remove the tooling and weld equipment.

The advantage of pulling instead of pushing is that all equipment can be placed on one side of the object being repaired (such as the rather large and fragile external tank of the space shuttle). This makes the logistics of performing a plug weld much easier in some cases than if standard plug push welding were to be performed.

Figure 10:
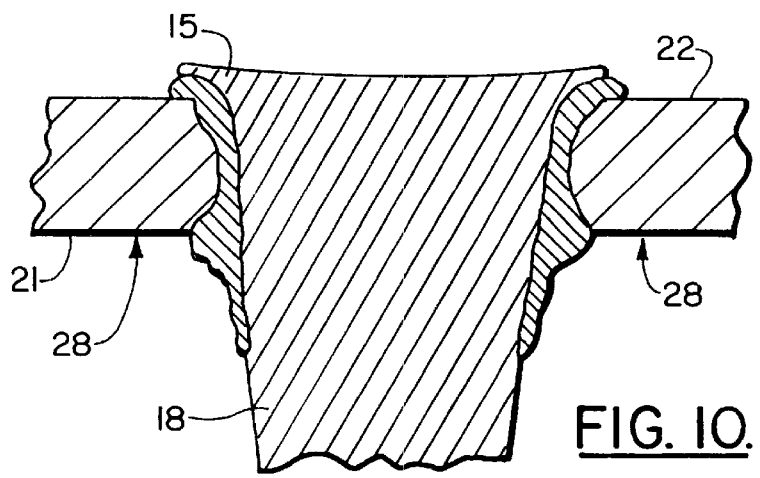
FIGS. 10 and 11 are sectional views that illustrate complete bonding using the preferred embodiment or the alternate embodiment of the apparatus of the present invention.
Figure 11:
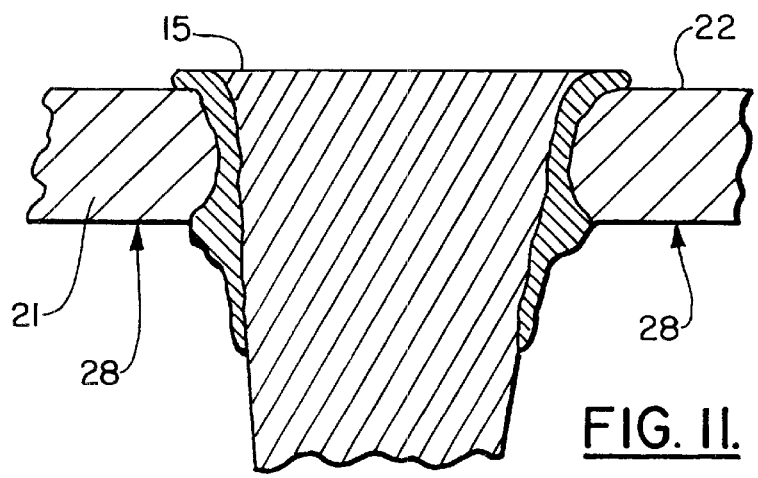

As shown in FIGS. 10 and 11, the enlarged diameter section 15 of top portion 18 ensures complete bonding between the plug 10 and the plate on the inside skin line or ISL side 28 of the weld. This enlarged diameter section 15 or "top hat" ensures complete bonding between the plug 10 or 10A and the plate sections 21, 22. This enlarged diameter section 15 or "top hat" achieves this improvement through a combined effect of supplying additional material to frictionally heat up at the plug 10 top portion 18 as well as providing additional radial and axial pressure at the plug top portion 18.

The current equipment and tooling includes a hydraulically powered direct drive motor 25 to rotate the plug and a suitable chuck to form an interface between motor 25 and plug 10 or 10A. If an inertial drive flywheel is instead used to rotate the plug, perhaps RPM as low as 1000 might produce satisfactory welds.

The typical maximum temperature for this process, using typical process parameters, using aluminum alloys is 900° F. as measured by an embedded thermocouple located within 0.100" from the original interface at an approximate depth of 33% to 50% through the substrate's thickness. The first cycle ends after a pre-programmed time (typically less than 5 seconds, preferably from 0.25 seconds to 2 seconds, more preferably from 0.5 seconds to 2 seconds, and most preferably in about 1 second), displacement during heating (also referred to as 'burn-off') (typically 0.010 inches to 0.5 inches, preferably 0.150 inches to 0.400 inches, more preferably 0.200 inches to 0.350 inches, and most preferably 0.250 inches to 0.300 inches), or temperature (typically 500° F. to 1000° F., preferably 700° F. to 1000° F. as measured with an imbedded thermocouple within 0.1" of the original interface buried up to a depth of about 50% through the substrate's thickness.

A backing support 29 (also referred to as a pressure foot or collet) reacts the axial load, and also serves as a restraint to forge the extruded flash. The depth, diameter and profile of this support are optimized for each set of conditions, e.g. weld parameters, plug/hole geometrical design, plate thickness, etc., and is important in creating a defect-free weld. In the pull method, the backing support (also referred to as a pressure foot) consists of a collet of an appropriate diameter and geometry. Currently, the diameter of the collet is larger than the shaft of the plug that passes through it by at least 0.002", typically from 0.002" to 0.400", and preferably from 0.100" to 0.325". The profile of the collet may include a bevel, taper, groove or other type of depression to act as a reservoir for plasticized material to flow. Successful welds have been made with tapered backing supports, with a taper angle between 0° and 60°, most typically between 20° and 40°.

The present inventors use or contemplate using plug welding (push and/or pull) with 2195 Al—Cu—Li alloy and 2219 Al—Cu alloy. Development of plug welding includes plugs (for example) of extruded Al—Cu—Li 2195 in the T3, T8, and T8 overage condition welded into (1) Al 2195-T8 sheet, extrusion and plate, (2) 2195-T8/2195-T8 fusion welded sheet, extrusion and plate with Al 4043 filler wire, (3) 2195-T8/2219-T8 fusion welded sheet, extrusion and plate with Al 4043 filler wire, (4) 2219-T8/2219-T8 fusion welded sheet, extrusion and plate with Al 4043 filler wire, (5) 2219-T8/2219-T8 fusion welded sheet, extrusion and plate with Al 2319 filler wire, (6) friction stir welded 2195-T8/2195-T8 sheet and plate, where all sheets and plates were of thicknesses greater than 0.12" and no greater than 1.00" and all plugs were a diameter between 0.500" and 1.500".

The main application of the Friction Pull Plug Welding Top Hat Plug Design is for solid state repair welding of welded pressure vessels utilized in the aerospace industry. This process would also be useful in any application where a defect free, high strength, circular weld of up to about 1" diameter is required. This process could also be readily utilized to repair the Friction Stir Welding exit keyhole on circumferential welds. Other applications could be found throughout the automotive, aircraft, marine, and aerospace industries.

This application could be utilized in all other alloy systems or metal matrix composites.

PARTS LIST:

The following is a list of parts and materials suitable for use in the present invention:

| Part Number | Description |
| --- | --- |
| 10 | pull plug |
| 10A | pull plug |
| 11 | frustoconical section |
| 12 | shank |
| 13 | frustoconical section |
| 14 | tip |
| 15 | enlarged diameter section |
| 16 | curved annular shoulder |
| 17 | edge |
| 18 | top portion |
| 19 | annular shoulder |
| 20 | lower portion |
| 21 | plate section |
| 22 | plate section |
| 23 | threaded section |
| 24 | hole |
| 25 | rotary tool |
| 26 | arrow |
| 27 | arrow |
| 28 | outside skin line surface |
| 29 | backing support |
| 30 | arrow |
| 31 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A friction pull plug welding apparatus for repairing a defect in a weld that has been removed, leaving a defect opening in the weld that is open ended, having first and second end portions, comprising;

a) pull plug body that fits the defect opening, wherein the pull plug body includes first and second sections, the first section being sized and shaped to fit through the defect opening, the second section having a part that is sized and shaped to not fit through the opening b) a rotary tool having a chuck that is connected during use to the first section of the pull plug body at the first end portion of the opening; and c) the rotary tool and chuck enabling simultaneous tension and rotation to be imparted to the plug body.

2. The friction pull plug welding apparatus of claim 1 wherein the rotary tool rotates at between about 4000–6000 revolutions per minute during use.

3. The friction pull plug welding apparatus of claim 1 wherein the rotary tool rotates at least about 4000 revolutions per minute during use.

4. The friction pull plug welding apparatus of claim 1 wherein the chuck has a tensile strength of at least 1,000 pounds.

5. The friction pull plug welding apparatus of claim 1 wherein the chuck has a tensile strength of between about 1,000 and 20,000 pounds.

6. The friction pull plug welding apparatus of claim 1 wherein the chuck and pull plug body are removably connectable.

7. The friction pull plug welding apparatus of claim 1 wherein the chuck and pull plug body are removably connectable with a threaded connection.

8. The friction pull plug welding apparatus of claim 1 wherein the pull plug body annular surface is a curved annular surface.

9. The friction pull plug welding apparatus of claim 1 wherein the pull plug body annular surface is a curved annular surface having a cross section with a radius of curvature of less than one inch.

10. The friction pull plug welding apparatus of claim 1 wherein the pull plug body annular surface is a curved annular surface having a cross section with a radius of curvature of about three sixteenths inches.

11. A friction pull plug welding apparatus for repairing a defect in a weld that has been removed, leaving a defect opening in the weld that is open ended, the defect opening having first and second end portions, comprising;
    a) a pull plug body that fits the defect opening, wherein the pull plug body includes first and second sections, the first section being sized and shaped to fit through the defect opening, the second section having a part that is sized and shaped to not fit through the opening, said second section including a maximum diameter portion with an annular surface that rapidly increases in diameter when measured longitudinally and when compared to the overall length of the pull plug body;
    b) a rotary tool having a chuck that is connected during use to the first section of the pull plug body at the first end portion of the opening; and
    c) the rotary tool and chuck enabling simultaneous tension and rotation to be imparted to the plug body.

12. The friction pull plug welding apparatus of claim 11 wherein the rotary tool rotates at between about 4000–6000 revolutions per minute during use.

13. The friction pull plug welding apparatus of claim 11 wherein the rotary tool rotates at least about 4000 revolutions per minute during use.

14. The friction pull plug welding apparatus of claim 11 wherein the chuck has a tensile strength of at least 1,000 pounds.

15. The friction pull plug welding apparatus of claim 11 wherein the chuck has a tensile strength of between about 1,000 and 20,000 pounds.

16. The friction pull plug welding apparatus of claim 11 wherein the chuck and pull plug body are removably connectable.

17. The friction pull plug welding apparatus of claim 11 wherein the chuck and pull plug body are removably connectable with a threaded connection.

18. A friction pull plug welding apparatus for repairing a defect in a weld that has been removed, leaving a defect opening in the weld that is open ended, the defect opening having first and second end portions, comprising;
    a) a pull plug body that fits the defect opening, wherein the pull plug includes first and second sections, the first section being sized to fit through the opening, the second section being too large to fit through the opening;
    b) a rotary tool having a chuck that is connected during use to the first section of the pull plug body at the first end portion of the opening;
    c) the rotary tool and chuck enabling simultaneous tension and rotation to be imparted to the plug body.

19. A friction pull plug welding apparatus for repairing a defect in a weld that has been removed from a welded panel that has inner and outer surfaces, leaving a defect opening in the weld that is open ended and having inner and outer end portions, comprising;
    a) a pull plug body that fits the defect opening, wherein the pull plug body includes first and second sections, the first section being sized and shaped to fit through the defect opening, the second section having a part that is sized and shaped to not fit through the opening, at least a portion of the second section being tapered;
    b) a rotary tool that is connected during use to the first section of the pull plug body at the outer end portion of the opening; and
    c) the rotary tool enabling simultaneous tension and rotation to be imparted to the plug body sufficient to cause at least part of the second section of the pull plug body to flow.

20. The friction pull plug welding apparatus of claim 19 wherein the rotary tool rotates at between about 4000–6000 revolutions per minute during use.

21. The friction pull plug welding apparatus of claim 19 wherein the rotary tool rotates at least about 4000 revolutions per minute during use.

22. The friction pull plug welding apparatus of claim 19 wherein the chuck has a tensile strength of at least 1,000 pounds.

23. The friction pull plug welding apparatus of claim 19 wherein the rotary tool has a connecting portion with a tensile strength of between about 1,000 and 20,000 pounds.

24. The friction pull plug welding apparatus of claim 15 wherein the connecting portion is removably connectable to the pull plug body.

25. The friction pull plug welding apparatus of claim 16 wherein the connecting portion and pull plug body are removably connectable with a threaded connection.

26. A friction pull plug welding apparatus for repairing a defect in a weld that has been removed, leaving a defect opening in the weld that is open ended, the defect opening having first and second end portions, comprising;
    a) a pull plug body that fits the defect opening, wherein the pull plug includes first and second sections, the first section being sized to fit through the opening, the second section being too large to fit through the opening;
    b) a rotary tool that is connectable during use to the first section of the pull plug body at the first end portion of the opening;
    c) the rotary tool enabling simultaneous tension and rotation to be imparted to the plug body with sufficient tension and rotation to cause it least a portion of the second section of the pull plug body to flow.

27. The friction pull plug welding apparatus of claim 19 wherein the rotary tool rotates at between about 4000–6000 revolutions per minute during use.

28. The friction pull plug welding apparatus of claim 19 wherein the rotary tool rotates at least about 4000 revolutions per minute during use.

29. The friction pull plug welding apparatus of claim 19 wherein the chuck has a tensile strength of at least 1,000 pounds.

30. The friction pull plug welding apparatus of claim 19 wherein the rotary tool has a connecting portion with a tensile strength of between about 1,000 and 20,000 pounds.

31. The friction pull plug welding apparatus of claim 15 wherein the connecting portion is removably connectable to the pull plug body.

32. The friction pull plug welding apparatus of claim 16 wherein the connecting portion and pull plug body are removably connectable with a threaded connection.

* * * * *